Patented June 3, 1930

1,762,021

UNITED STATES PATENT OFFICE

GEORG KRÄNZLEIN, MAX HEYSE, AND PAUL OCHWAT, OF HOCHST-ON-THE-MAIN, GERMANY, ASSIGNORS TO GENERAL ANILINE WORKS, INC., OF NEW YORK, N. Y., A CORPORATION OF DELAWARE

CONDENSATION PRODUCTS OF THE NAPHTHOSTYRIL SERIES AND PROCESS OF PREPARING THE SAME

No Drawing. Application filed November 21, 1927, Serial No. 234,903, and in Germany November 30, 1926.

The present invention relates to condensation products of the naphthostyril series and process of preparing the same.

We have found that products are obtained which are useful as dyestuffs, or as intermediate products for the manufacture of dyestuffs, by condensing naphthostyril, or a substitution product thereof, with an aromatic compound containing at least one reactive nuclear hydrogen atom, particularly with a monovalent or polyvalent phenol or with a tertiary amine containing the group

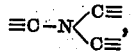

wherein at least one of the three C atoms belongs to an aromatic nucleus. Suitable condensing agents are, for example, phosphorus halides and thionyl chloride or the like. The condensation products produced from the said amines are basic dyestuffs and have an enhanced fastness to light as compared with triphenylmethane dyestuffs. The products produced by means of the polyhydricphenols, such as pyrogallol, oxyhydroquinone, gallic acid and resorcinol or the like, are dyestuffs capable of being chromed. Both the basic condensation products obtained from the amines and the acid condensation products obtained from the phenols, can easily be sulfonated to yield acid wool dyestuffs of valuable properties.

The condensation products obtainable by our new process may be represented by the following formula:

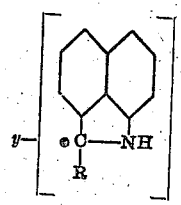

wherein $y$ stands for the residue of an acid or a sulfo group substituted for a nuclear hydrogen atom, R for an aromatic compound deprived of that nuclear hydrogen atom which in the compound when complete is particularly reactive.

The following examples illustrate the invention, but they are not intended to limit it thereto; the parts being parts by weight:—

1. 20 parts of naphthostyril, 50 parts of dimethylaniline and 14 parts of phosphorus oxychloride are stirred together for 24 hours at ordinary temperature with exclusion of moisture, and the mixture is then heated for 5 hours at 100° C. The mass thus obtained is made slightly alkaline with caustic soda lye and distilled with steam; the separated color base is dissolved in hot water which is slightly acid with hydrochloric acid, and after the solution has cooled the dyestuff is precipitated in crystalline condition by addition of sodium acetate. It is obtained in a pure state by recrystallization from dilute hydrochloric acid. It dyes cotton mordanted with tannin, or wool, blue violet.

The dyestuff has probably the following formula:

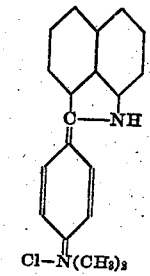

Dyestuffs of similar tints are obtained in analogous manner when diethylaniline, methylbenzylaniline, methylcyclohexylaniline, ethylbenzylaniline, dibenzylaniline, ethylcarbazole, N-methyldiphenylamine or the like is substituted for the dimethylaniline used in the example. Dialkyl-α-naphthylamine and dialkyl-β-naphthylamine yield pure blue dyestuffs.

2. 17 parts of naphthostyril, 40 parts of meta-diethylaminophenetol and 12 parts of phosphorus oxychloride are stirred together for 5 hours in a vessel sealed by calcium chloride and placed in the steam bath. After neutralization of the mass with sodium carbonate the excess of diethylaminophenetol is distilled in steam. The dyestuff is precipitated from the acidified solution by means of zinc chloride. It is red violet. The dyestuff has the following formula:

C—NH
—OC$_2$H$_5$
Cl—N(C$_2$H$_5$)$_2$

By substituting for the diethylaminophenetol meta-chlorodimethylaniline or meta-chlorodiethylaniline dyestuffs of more bluish tints are obtained.

3. 17 parts of naphthostyril, 15 parts of pyrogallol and 12 parts of phosphorus oxychloride are mixed with 100 parts of chlorobenzene and the mixture is heated for some hours at 110° C. The solvent is expelled by steam and the dyestuff dissolved in hot water containing some hydrochloric acid. On standing in the cold the dyestuff separates from the solution in the form of red-yellow needles; it has the character of a mordant dyestuff.

4. 20 parts of tetra-methyl-ortho-phenyl-enediamine, 10 parts of phosphorus oxychloride and 15 parts of naphthostyril are stirred in 50 parts of toluene for 5 hours at ordinary temperature and the mixture is then heated for 8 hours to 100° C. The mass is introduced into water, rendered alkaline with sodium carbonate and treated with steam. The residue is extracted with dilute hydrochloric acid and the colour base precipitated by addition of sodium acetate, filtered, washed and dried; it is dissolved in toluene and precipitated from the solution in the form of a salt by means of gaseous hydrochloric acid. When dry it is a dark powder having the lustre of bronze and dissolving easily in water to a blue solution; it dyes cotton mordanted with tannin, silk, paper and the like dark blue-grey.

5. By substituting tetra-methyl-meta-phenylenediamine for tetramethyl-ortho-phenylenediamine and otherwise proceeding in the manner described in Example 4 there is obtained a dyestuff which dyes cotton, silk, paper and the like reddish blue.

6. 15 parts of naphthostyril, 50 parts of toluene, 20 parts of N.N-dimethyl-1.2.3.4-tetrahydroquinoxaline (German patent application J. 30698) and 10 parts of phosphorus oxychloride are stirred together first at the temperature of the room and the mixture in then heated for about 6 hours at 100° C. The mass is introduced into water, made alkaline with sodium carbonate and treated with steam. The residue is dried, dissolved in 10 times its weight of toluene and precipitated from this solution in the form of its salt by means of gaseous hydrochloric acid. When dry it forms a black powder which dissolves easily in water to a dark blue solution. Cotton mordanted with tannin, paper and the like are dyed by it blue-black tints.

The following constitutional formulas may be attributed to the dyestuff:

[C—NH; CH$_3$—N, N—CH$_3$, Cl; C—C; H$_2$ H$_2$] or [C═N · HCl; CH$_3$—N, N—CH$_3$; C—C; H$_2$ H$_2$] or more simply [· C—NH, Cl; CH$_3$—N, N—CH$_3$; C—C; H$_2$ H$_2$]

7. The dyestuff obtained according to Example 6 by the condensation of naphthostyril and N.N-dimethyltetrahydroquinoxaline is stirred in 10 times its weight of sulfuric acid containing anhydride, at 30° C. until a test-sample shows that the mixture dissolves in sodium carbonate. The mass is then poured on ice, filtered and salted out. The resulting dyestuff dissolves in water to a reddish-blue solution and dyes wool blue tints.

8. 10 parts of the condensation product from naphthostyril and dimethylaniline are sulfonated by gently warming with 100 parts of oleum containing 20 per cent. of anhydride, the solution is poured on ice and the sulfonic acid of the dyestuff is separated by addition of common salt. The product dyes wool violet.

9. The condensation product from naphthostyril and pyragallol is sulfonated even at ordinary temperature by means of oleum of 10 per cent. strength. The sulfonic acid of the dyestuff, separated in the usual manner from the mixture, dyes wool yellow, which changes towards brown on washing and when after-chromed becomes a brilliant red-orange.

We claim:

1. The process of preparing condensation products of the naphthostyril series, which consists in condensing a compound of the following formula:

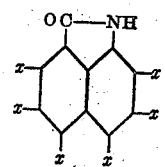

wherein $x$ stands for any substituent with an aromatic compound, containing at least one reactive nuclear hydrogen atom, by means of a phosphorus halide.

2. The process of preparing condensation products of the naphthostyril series, which consists in condensing a compound of the following formula:

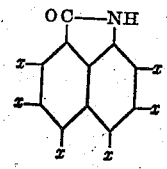

wherein $x$ stands for any substituent with an aromatic compound, containing at least one reactive nuclear hydrogen atom, by means of a phosphorus halide in the presence of a solvent.

3. The process of preparing condensation products of the naphthostyril series, which consists in condensing naphthostyril with an aromatic compound, containing at least one reactive nuclear hydrogen atom, by means of a phosphorus halide.

4. The process of preparing condensation products of the naphthostyril series, which consists in condensing naphthostyril with an aromatic compound containing at least one reactive nuclear hydrogen atom, by means of phosphorus oxychloride.

5. The process of perparing condensation products of the naphthostyril series, which consists in condensing naphthostyril with a tertiary amine which contains the group

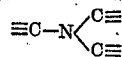

wherein at least one of the 3 C atoms belongs to an aromatic nucleus containing at least one reactive nuclear hydrogen atom, by means of a phosphorus halide.

6. The process of preparing condensation products of the naphthostyril series, which consists in condensing naphthostyril with a tertiary amine which contains the group $$\equiv C-N\begin{matrix}C\equiv\\C\equiv\end{matrix}$$

wherein at least one of the 3 C atoms belongs to an aromatic nucleus containing at least one reactive nuclear hydrogen atom, by means of phosphorus oxychloride.

7. The process of preparing condensation products of the naphthostyril series, which consists in condensing naphthostyril with N.N-dimethyl-1.2.3.4-tetrahydroquinoxaline of the following formula:

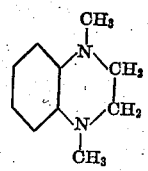

by means of a phosphorus halide.

8. The process of preparing condensation products of the naphthostyril series, which consists in condensing naphthostyril with N.N-dimethyl-1.2.3.4-tetrahydroquinoxaline of the following formula:

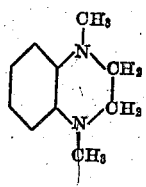

by means of phosphorus oxychloride.

9. The process of preparing condensation products of the naphthostyril series, which consists in condensing naphthostyril with N.N-dimethyl-1.2.3.4-tetrahydroquinoxaline of the following formula:

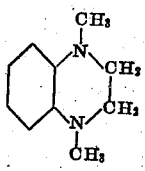

by means of phosphorus oxychloride, with the addition of toluene as a solvent.

10. As new products, the compounds of the following formula:

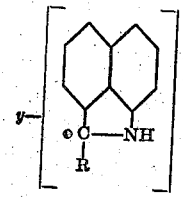

wherein $y$ stands for the residue of an acid or a sulfo group substituted for a nuclear hydrogen atom, R for an aromatic compound deprived of that nuclear hydrogen atom which in the compound when complete is particularly reactive, said products being dyestuffs which are soluble in water.

11. As new products, the compounds of the following formula:

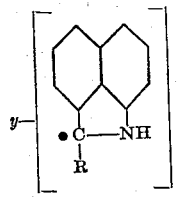

wherein $y$ stands for the residue of an acid or a sulfo group substituted for a nuclear hydrogen atom, R for a tertiary amine, which is deprived of that nuclear hydrogen atom which in the amine when complete is particularly reactive, the amine containing the group

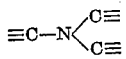

wherein at least one of the 3 C atoms belongs to an aromatic nucleus, said products being dyestuffs which are soluble in water.

12. As new products, the compounds of the following formula:

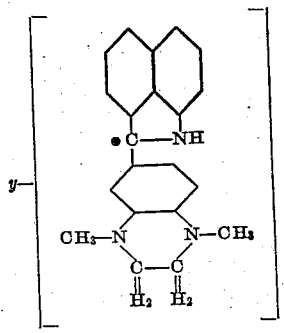

wherein $y$ stands for an acid residue or a sulfo group substituted for a nuclear hydrogen atom, said products being dyestuffs soluble in water and dyeing the fiber dark-blue tints.

13. As a new product, the compound of the following formula:

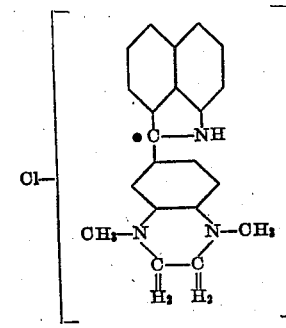

said product being a dyestuff forming in a dry state a black powder, readily dissolving in water to a dark-blue solution and dyeing cotton mordanted with tannin, paper or the like, blue-black tints.

In testimony whereof, we affix our signatures.

GEORG KRÄNZLEIN.
MAX HEYSE.
PAUL OCHWAT.